(12) United States Patent
Kondo et al.

(10) Patent No.: US 6,763,522 B1
(45) Date of Patent: *Jul. 13, 2004

(54) SYSTEM AND METHOD FOR A DIGITAL TELEVISION ELECTRONIC PROGRAM GUIDE

(75) Inventors: Shigeharu Kondo, San Diego, CA (US); David S. Wang, Fremont, CA (US); Jesse Ellenbogen, Cupertino, CA (US); Priscilla Man-San Chung, San Francisco, CA (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 103 days.

(21) Appl. No.: 09/107,938

(22) Filed: Jun. 30, 1998

(51) Int. Cl.[7] .......................... H04N 5/445; G06F 3/00; G06F 13/00
(52) U.S. Cl. .............................. 725/39; 725/43; 725/44
(58) Field of Search ................................ 345/327, 575; 348/7, 9, 10, 423, 845.1, 845.2, 845.3, 464, 563–564, 569; 380/49, 10, 7; 725/39–44

(56) References Cited

U.S. PATENT DOCUMENTS

| | | |
|---|---|---|
| 5,353,121 A | 10/1994 | Young et al. |
| 5,479,266 A | 12/1995 | Young et al. |
| 5,479,268 A | 12/1995 | Young et al. |
| 5,485,221 A * | 1/1996 | Banker et al. ............... 348/563 |
| 5,532,754 A | 7/1996 | Young et al. |
| 5,541,738 A | 7/1996 | Mankovitz |
| 5,543,852 A | 8/1996 | Yuen et al. |
| 5,550,576 A | 8/1996 | Klosterman |
| 5,585,838 A * | 12/1996 | Lawler et al. ............... 348/906 |
| 5,589,592 A | 12/1996 | Knee et al. |
| 5,592,551 A * | 1/1997 | Lett et al. ....................... 380/20 |
| 5,596,373 A * | 1/1997 | White et al. ................. 348/569 |
| 5,635,978 A | 6/1997 | Alten et al. |
| 5,635,989 A | 6/1997 | Rothmuller |
| 5,642,153 A * | 6/1997 | Channey et al. ................ 348/7 |
| 5,699,125 A | 12/1997 | Rzeszewski et al. |
| 5,710,601 A * | 1/1998 | Marshall et al. ............. 348/906 |
| 5,734,589 A * | 3/1998 | Kostreski et al. ............ 345/327 |
| 5,737,030 A * | 4/1998 | Hong et al. .................. 348/564 |
| 5,812,123 A * | 9/1998 | Rowe et al. .................. 345/327 |
| 5,828,420 A * | 10/1998 | Marshall et al. ............. 348/906 |
| 5,900,915 A * | 5/1999 | Morrison ...................... 345/327 |

(List continued on next page.)

*Primary Examiner*—Andrew Faile
*Assistant Examiner*—Hai V. Tran
(74) *Attorney, Agent, or Firm*—Harold T. Fujii

(57) ABSTRACT

A system and method for providing an electronic program guide for broadcasted digital television wherein the electronic program guide displays only currently broadcasting minor channels, and timely event and contextual information. The system of the present invention includes program code in a memory for causing a tuner/de-multiplexor subsystem to tune to a preselected major channel broadcast frequency and to provide thereby at least one transport stream comprising a plurality of associated digital data elementary streams. The elementary streams include minor channel audio and video, as well as program and system information tables (PSIT), all of which are associated by packet identifiers to provide a table hierarchy. The system of the present invention compares presently broadcasting minor channel and PSIT information with corresponding information in memory. If the presently broadcasting information is more contemporaneous than the stored information, the stored information is updated, or replaced, with the presently broadcasting information to enable display of only actively broadcasting minor channels and up-to-the-minute event and contextual information.

23 Claims, 6 Drawing Sheets

U.S. PATENT DOCUMENTS

| | | | | |
|---|---|---|---|---|
| 5,901,366 A | * | 5/1999 | Nakano et al. | 455/575 |
| 5,907,323 A | * | 5/1999 | Lawler et al. | 725/41 |
| 5,912,664 A | * | 6/1999 | Eick et al. | 345/327 |
| 5,917,481 A | * | 6/1999 | Rzeszewski et al. | 348/906 |
| 5,940,073 A | * | 8/1999 | Klosterman et al. | 345/327 |
| 5,959,659 A | * | 9/1999 | Dokic | 348/7 |
| 6,037,998 A | * | 3/2000 | Usui et al. | 348/569 |
| 6,111,614 A | * | 8/2000 | Mugura et al. | 348/569 |

\* cited by examiner

SYSTEM AND METHOD FOR A DIGITAL TELEVISION ELECTRONIC PROGRAM GUIDE

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

1. Field of the Invention

This invention relates generally to the field of electronic program guides. More particularly, this invention relates to a digital television electronic program guide system and method for providing updated program and system information.

2. Background of the Invention

Electronic program guides (EPGs) facilitate identifying event (e.g., a television program) content and times of broadcasted video by displaying broadcast information relevant to the content of the event. EPGs typically include a list of events and their schedules for the particular broadcast channel being viewed, or for multiple broadcast channels available for viewing. In analog television (ATV) broadcasts, a single broadcast channel includes both audio and video signals. Information data is typically included in the vertical blanking interval (VBI) line, not normally visible during the display of the audio/video event. This information data is extracted from the VBI and stored for subsequent display in an electronic program guide.

ATV broadcasts include only single program content since the bandwidth allocated to it's physical broadcast channel is nearly fully utilized by the analog signal. Under the present standards for digital television (DTV), however, the typical 6 MHz physical channel used for ATV broadcast supports about 19 Mbps of digital signal throughput. Presently, audiovisual signals with standard resolution can be compressed using, for example, MPEG compression schemes to attain sustainable rates of 6 Mbps, or approximately 3 to 4 DTV channels can be safely supported in a single, digital-signal transport stream without congestion of the physical channel. Moreover, sufficient bandwidth is available within the same transport stream to provide several additional low-bandwidth, non-conventional services such as: weather reports, stock indices, headline news, software download (for games or enhanced applications), image-driven classified ads, home shopping, pay-per-view information, and the like.

It is therefore practical to provide services (virtual channels) carried in a physical transmission channel (19 Mbps of bandwidth for the United States) numbering ten or more. For example, a service provider that is broadcasting television data over a broadband physical channel (major channel) is able to simultaneously broadcast multiple DTV programs over virtual channels (minor channels), with each minor channel having its own associated event content and event schedule elementary digital data streams.

Unlike ATV broadcasts where it is safely presumed that the broadcaster is always actively broadcasting its single channel over its allocated physical channel, and where only a single list of events is necessary to describe the television program content on that physical channel, the number and types of minor channels comprising a DTV major channel require numerous and extensive event information. Moreover, the number and types of minor channels contained within the major channel may change continuously and without warning. Such changes compromise the ability of electronic program guides to accurately display to the television viewer only those minor channels which are actively broadcasting, and render dubious the validity of the displayed event information for each active minor channel.

SUMMARY OF THE INVENTION

The system of the present invention effectuates an EPG for DTV that dynamically detects changes in the broadcast status of minor and major DTV channels, and changes in their event information, prior to displaying the EPG information, thereby enabling the display of updated minor and major channels and event information on a display screen. In some embodiments, the system of the present invention includes a digital tuner, a transport stream de-multiplexor, a video circuit, a graphics circuit, and digital signal processor circuit. Additionally, a graphics/video mixer, and RAMDAC may be provided for concurrently displaying video and EPG graphics on a display.

The tuner circuit receives a modulated digital broadcast signal and demodulates at least one physical transmission (major) channel to provide at least one digital signal transport stream. A transport stream de-multiplexor de-muxes the transport stream to provide digital signal elementary streams including at least one video elementary stream, at least one audio elementary stream, and program and system information (PSI) elementary streams. The PSI streams comprise a hierarchy of associated tables that provide electronic program guide data at the event level for minor channels carried in the transport stream, for virtual channels comprising other transport streams, or for analog or data broadcasts. For purposes of the present invention, a program is defined as a collection of associated program elements (e.g., video, audio, data, and the like).

In some embodiments the PSI elementary streams are packetized and multiplexed according to the transport protocol detailed in ISO/IEC 13818-1, the disclosure of which is hereby incorporated by reference herein. In these embodiments, the PSI table protocol is defined by Advanced Television Systems Committee (ATSC) Standard A65, "Program and System Information Protocol For Terrestrial Broadcast and Cable," the disclosure of which is also hereby incorporated by reference herein. In accordance with the transport protocol each table includes a packet identifier (PID) permitting associating elementary stream packets with one another.

In accordance with one aspect of the EPG system of the present invention, the system of the present invention includes a digital signal processor circuit which compares currently broadcasting PSI parameters with PSI parameters previously stored in a memory to thereby determine whether the PSI content stored in memory is valid (i.e., unchanged). By way of operation, the transport de-multiplexor extracts the elementary streams from the transport stream packet to make the PSI elementary stream data available to the digital signal processor circuit. A computer memory for storing PSI table information and parameters is in electronic communication with the signal processor to permit retrieving and storing of PSI data. The memory used to store PSI content data is selected from volatile and non-volatile RAM devices including, but not limited to, SRAMs, EPROMs, and the like, magnetic and optical disks, and holographic memories.

By way of operation, a processor reads the currently broadcasting value of at least a portion of the system parameters from the appropriate PSI elementary streams, and compares those currently broadcasting values with previously stored values of those parameters to determine if the parameter values have changed. If a parameter value has changed, the currently broadcasting program and system information is read into memory to thereby update the stored program and system information. Machine readable code used to effectuate the features of the EPG of the present invention is stored in either the same memory as the PSI data content and parameter values, or in a separate ROM.

In accordance with another aspect of the EPG system of the present invention, a graphics circuit is in electrical communication with the processor and with the memory to permit graphically displaying on a display monitor an EPG showing only validated, or updated, minor and major channels, and event information. Since the program and system information retrieved from memory is always previously compared to the currently broadcasting PSI prior to displaying the EPG updated information, the displayed EPG provides accurate, valid program and system information including minor and major channel broadcasting status, event schedules, and related contextual information.

In accordance with yet another aspect of the system of the present invention, the digital tuner is in electrical communication with the digital signal processor circuit to thereby enable the processor to command the tuner/decoder subsystem to tune to an alternate minor channel, or an alternate physical channel. Advantageously, the selected channel is known to be actively broadcasting since the broadcasting status of the selected channel has been verified as active by the system and method of the present invention prior to displaying the EPG. Conveniently, the EPG of the present invention provides a graphical user interface to enable the viewer to select a minor channel or a major channel using a cursor or other graphics selection means, including but not limited to a cursor, icon, selection box, highlighted selection, combinations of the foregoing, and the like, on the display screen. Selection of a channel may be made as between minor channels, between major channels, or between a major and a minor channel. Once the viewer has selected a channel, an interrupt is generated by the viewer signaling the processor to command the digital tuner to tune to the frequency of the selected channel.

The method of the present invention includes decoding a digital signal transport stream to provide program elementary streams to the system of the present invention as described above, comparing currently broadcasting PSI parameter values with previously stored PSI parameter values, and refreshing PSI parameter values in memory if the comparison indicates that the parameter values have changed. As a result, the EPG of the present invention displays only current, valid program information.

In accordance with one aspect of the method of the present invention, a digital signal transport stream is decoded to provide a plurality of digital signal elementary streams comprising associated video, audio, and program and system information digital data signal elementary streams. In some embodiments, the transport stream is packetized and identified according to a packet identifier (PID). The elementary streams comprise a hierarchy of associated tables used by the system of the present invention to provide the program and system information content displayed in the EPG of the present invention. The various tables include version number values indicating the current status of the information contained in the table. As information in a table changes, the version number increments to reflect a change in table content.

In accordance with another aspect of the method of this invention, the version number value of a table is used by the method of this invention to determine whether memory must be updated to include current program and system information. Version number values for each table used by the EPG of the present invention are stored in memory. These version numbers are retrieved from memory and compared to the corresponding currently broadcasting version numbers of the tables. If the version number values are different, thereby indicating that the information content of the associated table has changed, the information contained that table stored in memory is updated with the currently broadcasting information. Advantageously, by performing the above described comparison on a periodic basis, or whenever the EPG is invoked, the viewer receives only accurate, valid information in the EPG.

In accordance with yet another aspect of the method of the present invention, a cursor or user manipulable icon is displayed in the EPG permitting viewer selection of actively broadcasting channels. Once a channel has been selected, a control signal is sent to the processor to thereby instruct the tuner/decoder of the system of this invention to tune to the appropriate broadcast frequency and/or select the appropriate audio/video and PSI elementary streams. After decoding the transport stream containing the new channel information, the system queries the memory to determine if that alternate channel's program information had been previously stored. If not, the currently broadcasting program information is stored in memory. If the information had been previously stored, the processor compares the stored information with the currently broadcasting information as described above and updates the memory as necessary. In other embodiments, the method is simplified by immediately loading the currently broadcasting program information into memory without performing an initial comparison.

BRIEF DESCRIPTION OF THE DRAWINGS

The features of the invention believed to be novel are set forth with particularity in the appended claims. The present invention may be better understood, and its numerous features and advantages made apparent to those skilled in the art by reference to the accompanying drawings.

In the description below, like reference numerals are used to describe the same, similar or corresponding parts in the several views of the drawing.

DETAILED DESCRIPTION OF THE INVENTION

Figure 1:
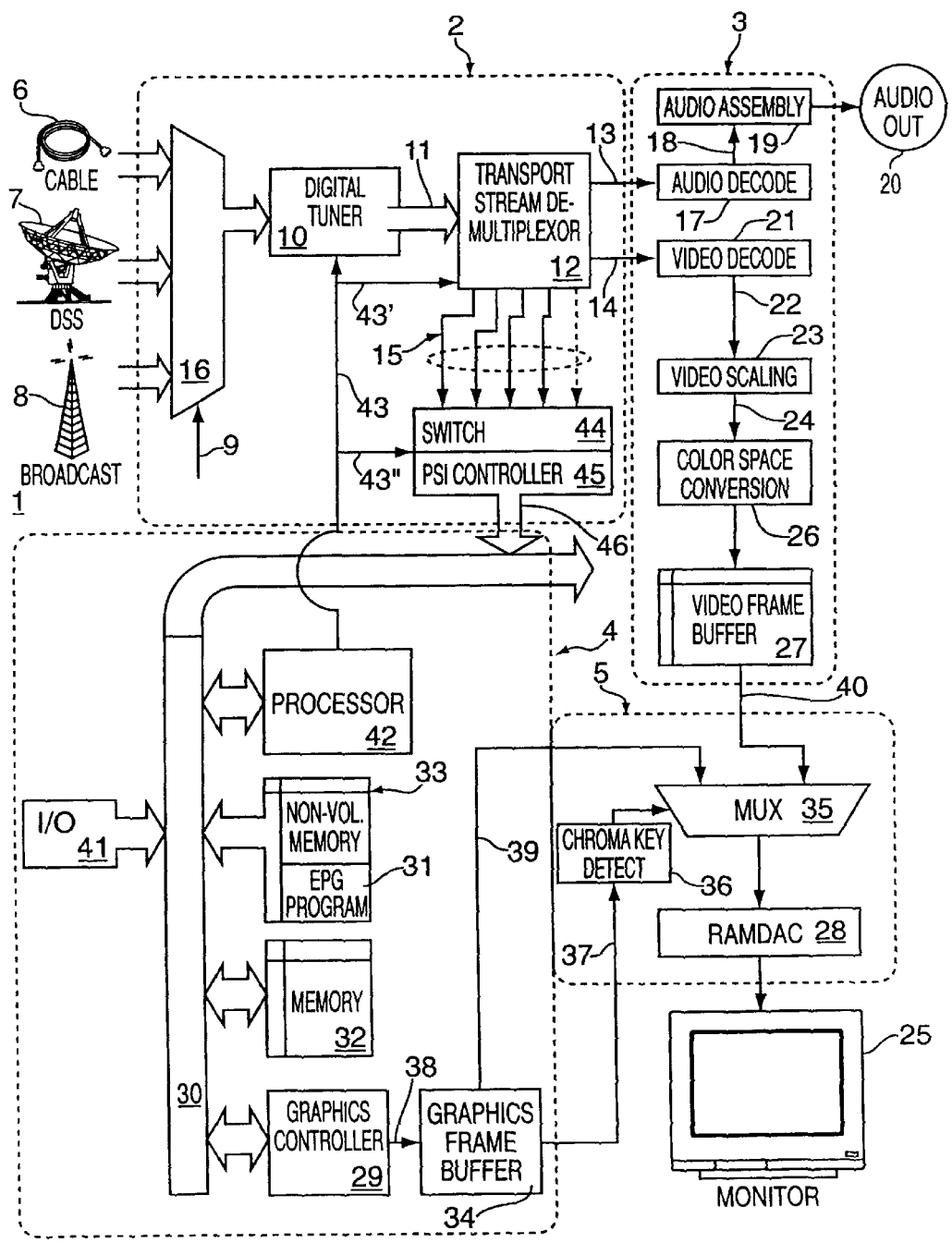
FIG. 1 is a conceptual diagram of the system of the present invention showing the cooperative relationships between the various subsystems.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described.

Turning now to FIG. 1, the EPG system 1 of the present invention includes a tuner subsystem 2, a decoder subsystem 3, a processor and graphics subsystem 4, and a video/graphics RAMDAC subsystem 5. The subsystems are in electronic communication with one another to thereby permit data and control signal exchange between subsystems.

Digital data signals are broadcast on a radio-frequency carrier and delivered to the system 1 via a signal carrier means, including but not limited to, cable 6, by satellite to a desktop box 7, or by a terrestrial broadcast station 8, as input to digital signal tuner subsystem 2. The digital signal tuner system comprises mux 16 which selects between the digital signal sources according to a control signal on line 9. The selected broadcast source is provided as input to digital tuner 10 wherein a digital signal is demodulated from the carrier to provide at least one digital signal transport stream. The digital signal transport stream is asserted on bus 11 to transport stream de-multiplexor 12. The transport stream de-multiplexor 12 separates the elementary digital data stream packets from the transport stream packet to provide elementary digital data signals including at least one audio 13, one video 14, and program and system information streams 15. In one embodiment, audio stream 13 and video stream 14 are compressed and encoded, for example, pursuant to an MPEG encoding standard.

The digital audio and video digital data signals 13 and 14 are communicated to audio/video subsystem 3. The audio/video subsystem includes audio decoder 17 which receives and decodes the digital, compressed audio signals to provide a decoded audio signal 18 to audio assembly 19 wherein the audio signal is processed for audio output 20.

The digital compressed/encoded video signal 14 is received by video decoder 21 wherein the digital compressed, encoded video signal is decoded to provide digitized compressed, transformed video information. The digital transformed compressed video information is inverse transformed, and then decompressed in accordance with the particular compression algorithm used.

The resulting digitized video signal is then optionally processed by video scalar using well known methods to enable displaying the video in a window on the display screen 25. In one embodiment, the scaled video signal 24 is in the YUV or YCrCb color space and must be transformed to the color space required by the monitor, typically RGB. Color space conversion is performed by a color space conversion circuit 26 using techniques well known in the art. Video frame buffer 27 receives the digital RGB video signal in preparation for further processing by RAMDAC 28.

Processor subsystem 4 includes a graphics controller 29 for directing digital graphics data, representing validated or updated PSI data, retrieved from memory 32, and formatted in accordance with processor readable program code 31 stored in non-volatile memory 33, to graphics frame buffer 34 via line 38. The digital graphics data is retrieved from graphics frame buffer 34, and the video data is retrieved from video frame buffer 27 and are inputted into mux 35 via lines 39 and 40 respectively. Chroma-key detector circuit 36 directs the mux 35 to switch between the graphics and video digital input signals by asserting a control signal on control line 37 to thereby permit the concurrent display of both the graphics signal (containing the validated, or updated, EPG information) and the video signals on display 25. In one embodiment, the graphics signal is transparently overlaid over the video signal to thereby simultaneously display the EPG over a background video. The graphics data in memory 32 includes updated program and system information used as content for the EPG.

Figure 2A:
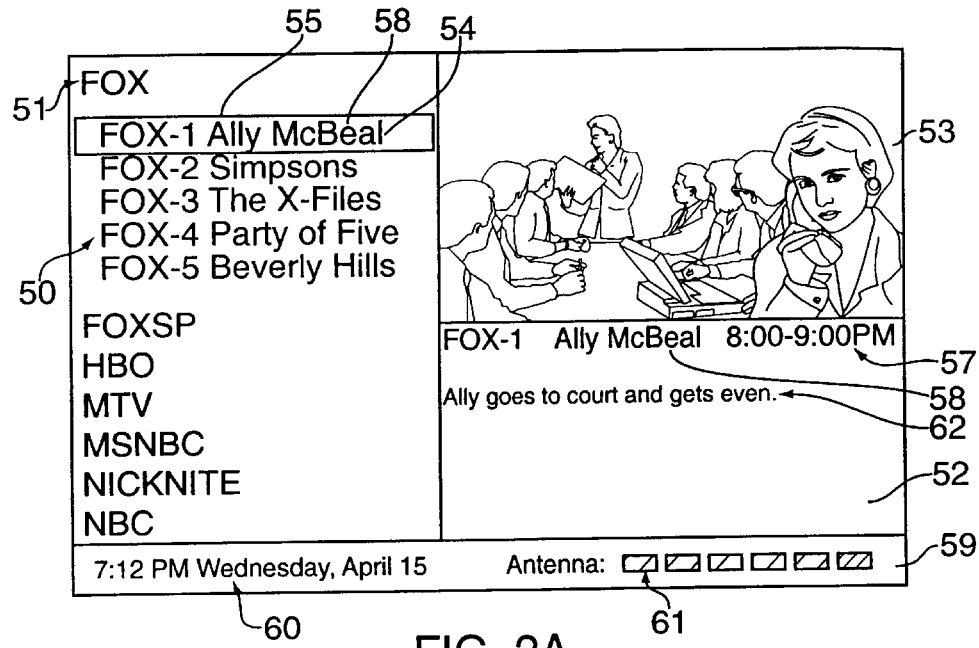
FIGS. 2A through 2D are examples of embodiments of the electronic programming guide of the present invention.

Referring now to FIG. 2A, a digital televison display is shown having both the EPG of this invention and video information concurrently displayed in contiguous graphics and video panels. The video panel 53 associated with the currently highlighted minor channel 54, as identified by movable cursor 55, is displayed in at least a portion of the video display. The EPG is created from graphics data and includes, but is not limited to, a listing of actively broadcasting minor channels 50: for the currently selected major channel 51, an event information panel 52 including television program times 57, titles 58 and contextual information 62 related to the presently highlighted event, and a system information panel 59 including current time and date 60, and signal quality 61 is optionally displayed. The contents of the event information panel will change in accordance with the presently selected program event.

In one embodiment the system information field 60 is normally hidden, and drops down when either a change in the antenna signal quality level 61, when a new channel is selected, or when the processor receives a user command to display the system information field. The system information field may be retracted by either a time-out, or a user interrupt detected by the processor.

Also, in one embodiment, the event information panel 52 may dynamically vary in size in accordance with the amount of contextual information 62 displayed. In one embodiment, an upper limit to the event information panel size may is defined to prevent obscuring the video panel 53. In that embodiment, if the event information panel is insufficiently large to accommodate all of the contextual information 62, the contextual inform is scrolled at a preselected rate to permit viewing the entire contents of the contextual information.

Figure 2B:
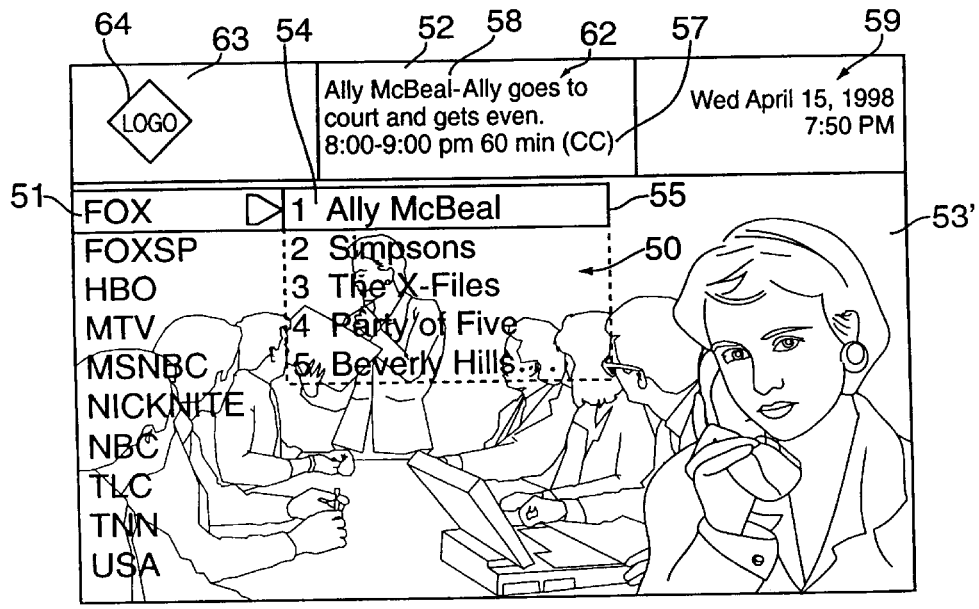

FIG. 2B shows an EPG as a transparent graphics overlying a video background 53' on at least a portion of the video display screen. The EPG of this embodiment includes a list of major channels including the presently selected major channel 51, a list of minor channels 50 actively broadcasting over the major channel, a movable cursor 55 for identifying and selecting an actively broadcasting minor channel, or for selecting another major channel. A system information panel 59 and event information panel 52 are also provided. Event information field 52 includes event scheduling for the presently selected minor channel 54 including event title 58, event starting and ending times 57, and related contextual information 62 for the presently highlighted minor channel 54 or event. A logo panel 63 permits displaying a logo 64.

Figure 2C:
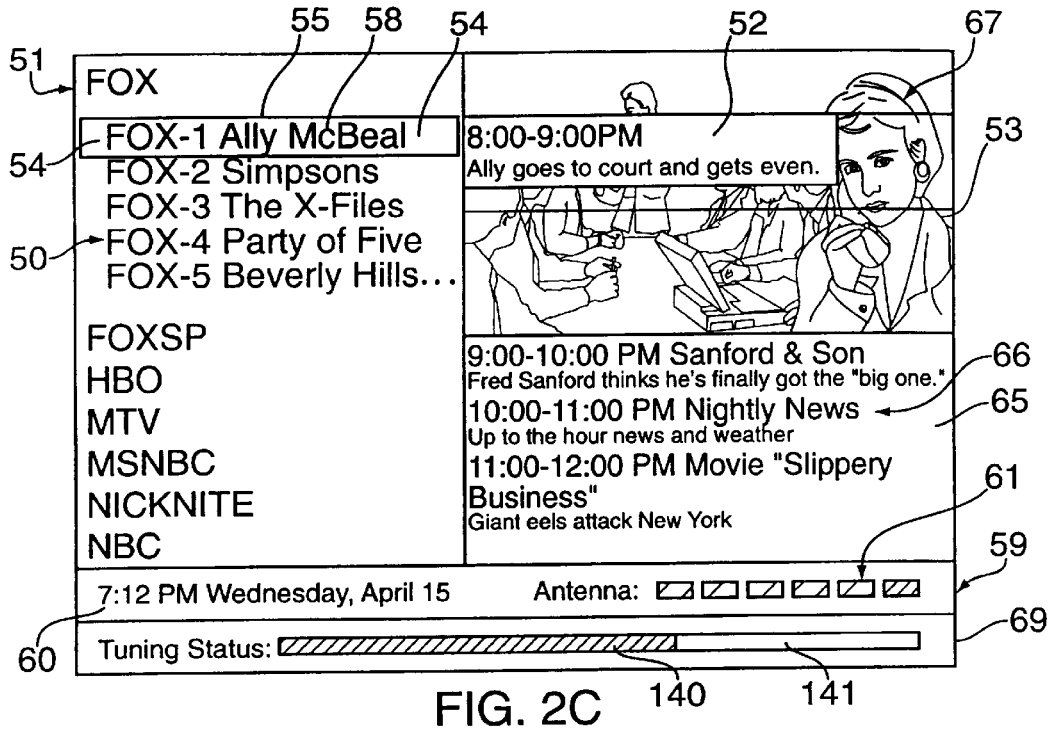

FIG. 2C illustrates another embodiment including a drop down event information panel 52. The contents of the event information panel is determined by the minor channel 40 presently highlighted by cursor 55. As the viewer moves the cursor from one channel to the next, the contents of the event information panel will change in accordance with the presently highlighted minor channel 54. In one embodiment, the video panel 53 will also display the video 67 associated with the presently highlighted minor channel 54. In an alternate embodiment, the video panel continues to display the video associated with the presently tuned minor channel (i.e., the minor channel last tuned to). If no new minor channel is selected (by sending the appropriate interrupt to the processor system of the present invention), then upon closing the EPG the displayed video will be the video associated with the last previously selected channel.

The EPG of FIG. 2C includes a future event information panel 65 wherein future event information 66 for the presently highlighted minor channel 54 is presented. The information is scrolled through the panel to permit viewing all of the contents of the future event information. In one embodiment, the user may control the scroll rate, the scroll direction, pause scrolling, and perform a search on the text of the future event information to locate phrase and words indicating programs of interest.

Also shown is a tuning status monitor panel 69 which drops down from the EPG whenever a new major channel is selected. The bar 140 travels across the indicator 141 graphically informing the viewer of the tuner status when tuning to the selected channel. The tuning status monitor panel is retracted after the tuner has completed the new channel tuning process.

Figure 2D:
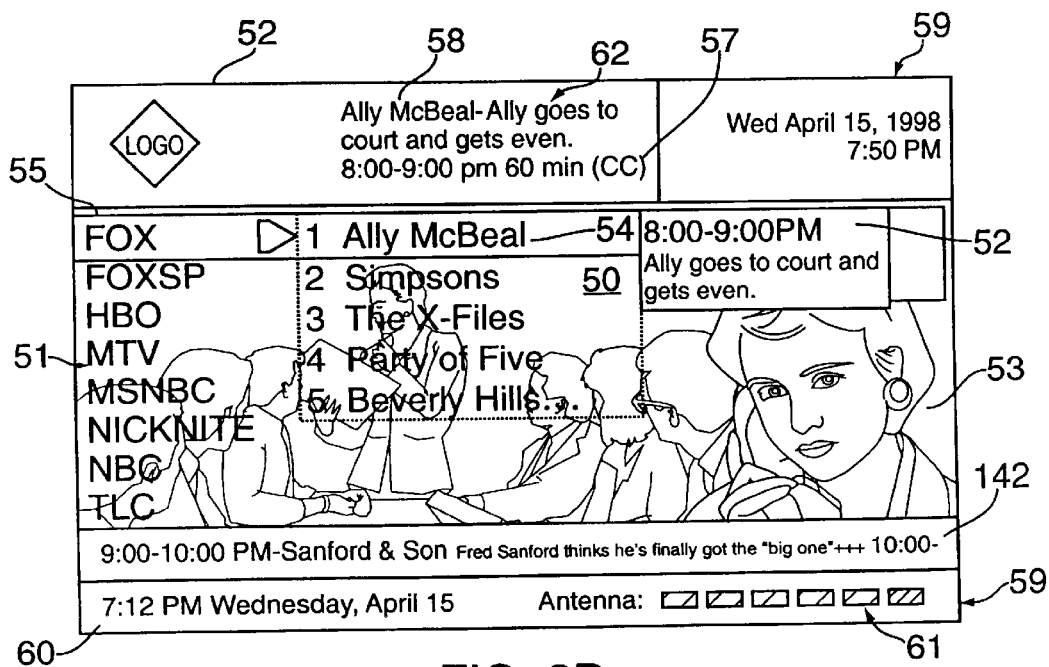

Yet anther embodiment of the EPG of the present invention in shown in FIG. 2D. As in the previous figure, drop down panel 52 provides event information of the currently broadcasting program for the current minor channel 54. Future event information however, is presented in panel 142 as a scrolling textual field. The "ticker-tape" scrolling is user-controllable permitting the user to control scroll parameters such as scrolling speed, direction, and pausing. An optional search feature permits locating future program information content containing key phrases and words of interest to the user.

FIGS. 2A through 2D are exemplary of the various ways the validated or updated information, as provided by the EPG system and method of the present invention, is presented. It is understood that the scope of information provided may include several hours of event titles, schedules, and contextual information for the currently selected minor channel. It is also understood that the panel arrangements shown are presented by way of example only, and that the panel arrangement may be modified or user defined to accommodate a particular panel arrangement preference. While FIGS. 2A through 2D illustrate a single EPG, it is understood in view of the foregoing discussion, that a plurality of EPGs may be simultaneously displayed on the video display for each of the minor channels of the currently tuned major channel. In one embodiment a single tuner sequentially accesses the minor channel program streams and refreshes the video and graphics for each panel. In an alternate embodiment, two tuners may be used to permit continuous viewing and updating of one EPG while the remaining EPGs are sequentially refreshed by the other tuner. It is also understood, in view of the foregoing disclosure and as will be discussed below, that all PSI displayed in the EPG(s) represent data that has been either validated or updated just prior to display.

Channel selection is made by moving the cursor 55 on the displayed EPG from one minor channel to another, between a minor channel and a major channel, or from one major channel to another. Once a channel has been selected, the viewer signals the system, using either a local or remote keypad, to tune to the selected channel. The system receives the change channel request, displays the selected channel video, and updates the program and system information of the newly selected channel prior to displaying the updated EPG.

Referring again to FIG. 1, I/O circuit 41 includes a remote control communication means, including but not limited to infrared, audio, voice, or radio enabled remote input, and keypad input of cursor position information, thereby enabling movement of the channel selection cursor on the display screen 25 to permit visual identification to the viewer of the presently tuned channel, and to permit selecting an alternate channel. A signal from I/O 41 indicating that a new channel is selected, is placed on data bus 30 and read by processor 42. Processor 42 asserts a command over line 43 to digital tuner 10 to tune to the frequency of the selected broadcast channel if a new major channel was selected. The digital signal transport stream for the newly selected major channel is de-muxed by de-multiplexor 12, and the audio, video, and program and system information elementary streams are processed as described above. If, on the other hand, a minor channel within the presently tuned physical channel is selected, the processor instructs the de-multiplexor via line 43 to select the corresponding program elementary streams associated with the desired minor channel.

The EPG algorithm 31 stored in memory 33 includes code segments readable by processor 42 to permit selecting and analyzing the PSI elementary streams associated with the newly selected channel, as will be discussed below, and updates, if necessary, the event and system information stored in memory 32 for the newly selected channel, thereby ensuring that the EPG system of the present invention accurately displays only actively broadcasting minor and major channels, and valid, up-to-the-minute event information. Processor 42 at the direction of the EPG algorithm 31 causes switch 44 via control line 43" to select corresponding PSI elementary streams from the elementary streams 15 provided by transport stream de-multiplexor 12. PSI controller 45 places the desired elementary streams on bus 30 via bus 46. Processor 42 reads the PSI information, and compares it to previously stored information. Differences between the presently read information for the selected minor channel; or the presently highlighted event, as compared to corresponding stored information in memory 32, results in the previously stored data being updated with the presently broadcasting information. It is understood, in view of the foregoing discussion, that the stored data may have only just the obsolete information replaced, or alternately, up to all fields for the selected channel or event may be overwritten.

Figure 3:
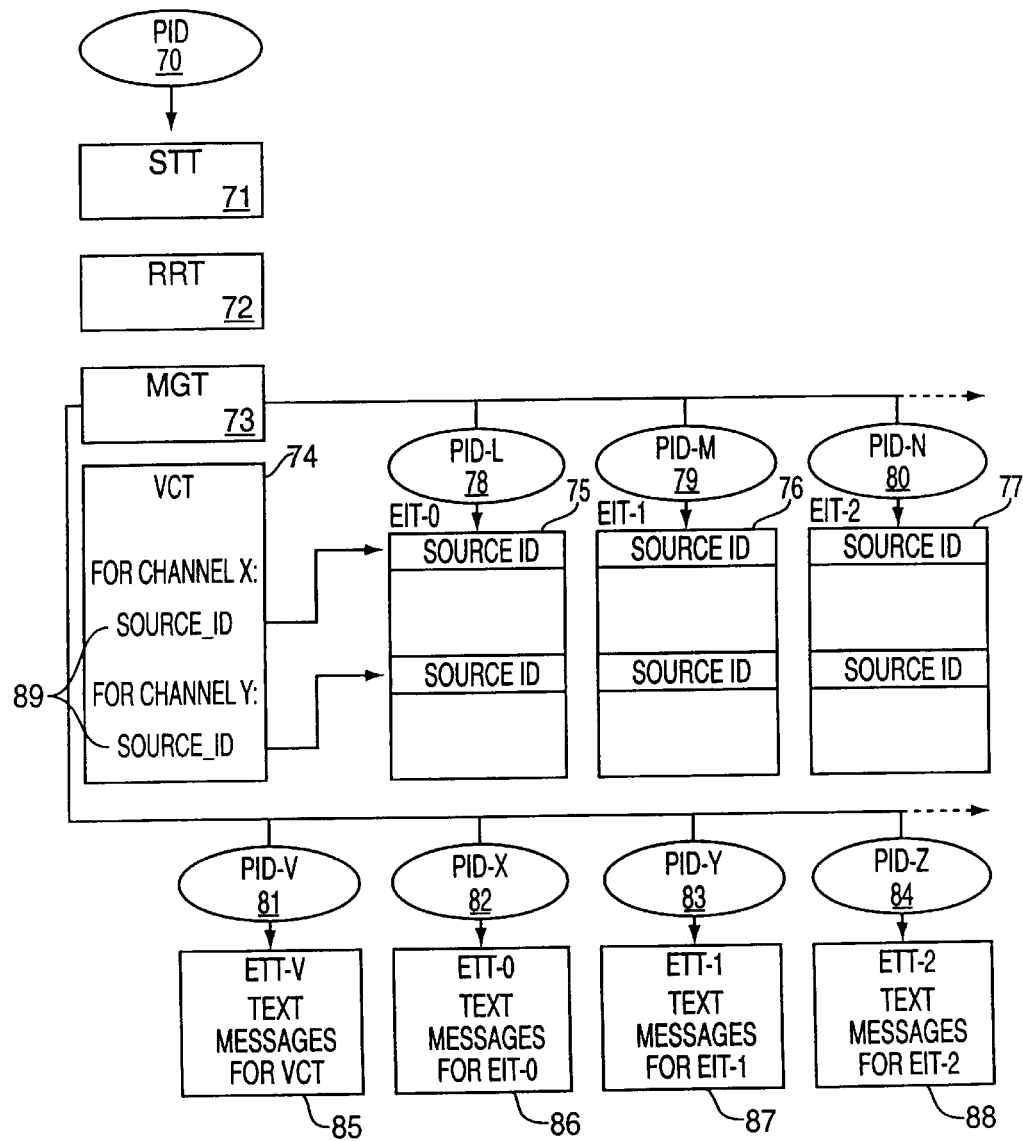
FIG. 3 is a flow diagram showing the hierarchical arrangement of the tables decoded from the packetized elementary streams.

The various components and hierarchy of the PSI data tables of one embodiment of the EPG system and method of the present invention are shown in FIG. 3. The packets of the base tables are all labeled with a preselected base packet identifier (PID) 70. The base tables include: the System Time Table (STT) 71, an optional Rating Region Table (RRT) 72, the Master Guide Table (MGT) 73, and the Virtual Channel Table (VCT) 74.

The STT 71 serves as a reference for the time of day. Receivers can use this table as a reference for timing start times of advertised events.

The RRT 72 provides a voluntary program rating system, and is used to transmit the rating standard.

The MGT 73 provides general information about all of the other tables in the PSI protocol, listing features such as version numbers, table sizes, and PIDs. Table sizes are described to enable memory allocation during decoding. Advantageously, the version numbers provided in the MGT are used by the system and method of the present invention to identify at least a portion of the tables that may need updating in memory. The PIDs are used to point to associated tables that are labeled with those PIDs.

The Virtual Channel Table (VCT) 74 contains a list of all of the channels that are, or will be, on-line plus their attributes; i.e., channel name, navigation identifiers, stream components, and the like. Conveniently, the VCT channel lists may also include analog channels and other digital channels found in different transport streams. Whenever the system of the present invention detects a change in the VCT version number, the VCT content has changed and must necessarily be reloaded into memory. The VCT includes at least one "source_id" record 89. The source_id is an internal index for representing a particular logical channel (minor channel). Event Information tables (EIT) and Extended Text Tables (ETT), as described below, use this number to provide a list of associated events or text messages respectively for a particular minor channel.

A second set of tables include Event Information Tables (EIT) 75, 76, and 77 whose PIDs 78, 79, and 80 are defined in the MGT. The EITs contain information which describe the events or TV programs associated with each of the minor channels listed in the VCT. Information contained in an EIT includes, but is not limited to, event names, and event start and stop times. System information included in each EIT includes PID number, and version number. The MGT increments the list of currently valid PIDs as event information become obsolete. Whenever the decoder in the present system monitoring the MGT detects a change in the version number of a table, it assumes that the table has changed and reloads the contents of the affected table into memory. If the version number has not changed, the information for that table presently in memory is flagged as valid and is displayed in the EPG.

As shown in FIG. 3, each of the Extended Text Tables (ETTs) 85, 86, 86, and 87 have a PID 81, 82, 83, and 84 defined in the MGT. An ETT contains textual information or messages, and is used to describe channel information, cost, coming attractions, movie descriptions, and the like. Each EIT may have one ETT. Similarly, an ETT may be associated with the VCT.

Table I shows, by way of example, an MGT indicating, in this case, a VCT, a RRT, four EITs, and one Extended Text Table (ETT) in the table hierarchy.

TABLE I

| MGT | | | |
| --- | --- | --- | --- |
| Table Type | PID | Version No. | Table Size (bytes) |
| VCT | 0x1FFB (base PID) | 4 | 485 |
| RRT-USQ | 0x1FFB (base PID) | 1 | 560 |
| EIT-0 | 0x1FD0 | 6 | 2730 |
| EIT-1 | 0x1FD1 | 4 | 1342 |
| EIT-2 | 0x1DD1 | 2 | 1224 |
| EIT-4 | 0x1DB3 | 7 | 1382 |
| ETT for VCT | 0x1AA0 | 21 | 4232 |
| ETT-0 | 0x1BA0 | 10 | 32420 |
| ETT-1 | 0x1BA1 | 2 | 42734 |

In the first entry of the MGT, the version number and size of the VCT is provided. The second entry corresponds to an instance of the RRT. The base PID (0x1FFB) is used for the VCT and the RRT instance. The next entries in the MGT correspond to the first four EITs supplied in the transport stream. The PIDs listed point to the EITs to permit associating those EITs with the VCT. After the EITs, the MGT indicates the existence of an ETT for minor channels carried using PID 0x1AA0. Similarly, the last two entries in the MGT indicate the existence of two ETTs, one for EIT-0 and the other for EIT-1.

The MGT continuously provides information about the status of all other tables (except for the STT which has an independent time reference function). The MGT is continuously monitored by the system and method of the present invention to prepare and anticipate changes in the channel/event structure. When tables are changed on the broadcast side, their version numbers are incremented and the new version numbers are listed in the MGT. Based on version updates and on the memory requirements, the system of the present invention can validate previously stored tables, or reload into memory newly defined tables for updated display of the EPG.

Figure 4:
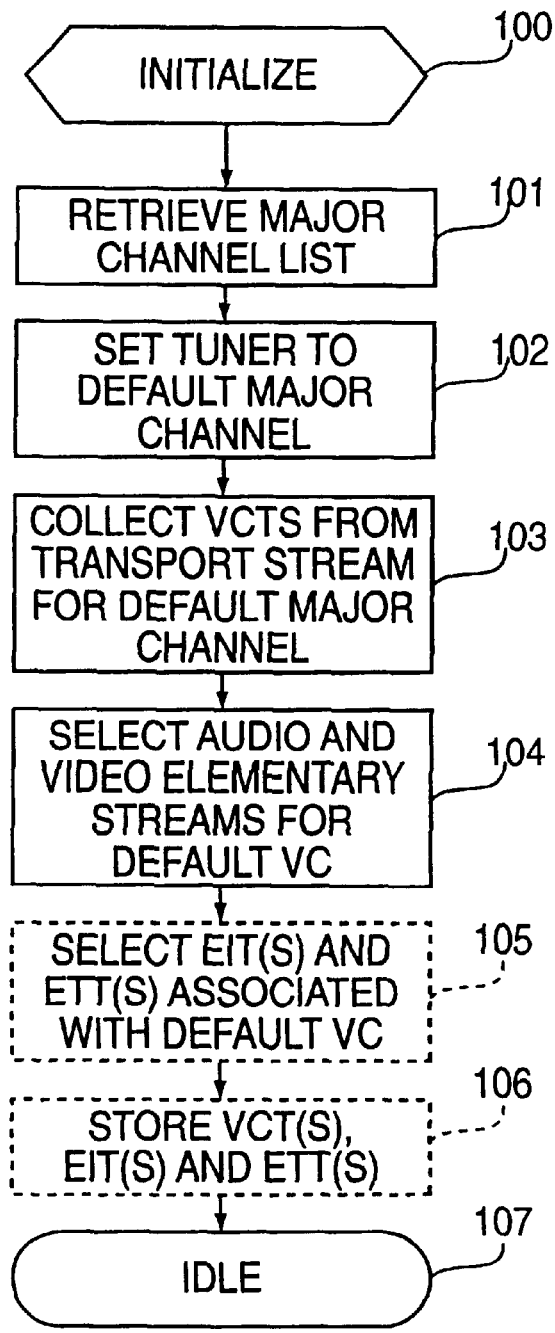
FIG. 4 is a flow diagram of the initialization process of the system of the present invention.

Referring now to FIG. 4, the method of the present invention includes the step of initializing the system 100 according to the steps shown. Upon starting the system, the algorithm of the present invention is accessed from memory to provide boot instructions to the processor. The major channel list is retrieved from memory at step 101. This list includes either those major channels previously available during a previous viewing, or a default, preselected major channel list. Alternately, the major channel list is dynamically constructed by the tuner subsystem of the present invention by scanning the broadcast frequency slots and identifying those frequency slots that are actively broadcasting. The attributes, including channel identifier and frequency, of the actively broadcasting major channels are then stored in memory. Scanning the frequency slots may be performed either during start-up or during shut-down of the system of the present invention. Alternately, in an embodiment of the system of the present invention having at least two tuners, broadcast frequency slots may be scanned in the background to identify actively broadcasting major channels and the actively broadcasting minor channels within those major channels while contemporaneously viewing a TV program, downloading data, or monitoring a particular channel.

The tuner subsystem of the system of the present invention tunes to the frequency of the default major channel at step 102. The default major channel may be either the last major channel selected prior to a previous shut-down of the system, or a preselected major channel according to a predetermined rule, for example the first major channel in the major channel list. The VCTs in the transport stream associated with the presently selected major channel are asserted onto the data bus by the tuner subsystem and read into memory at step 102 Channel tuning includes the step 103 of collecting the VCT containing the current list of available services from the transport stream. Once the VCT has been collected, any minor channel present in the transport stream may be accessed by referring to the major and minor channel numbers. A default minor channel associated with the default major channel is then identified by the system; for example, the first minor channel in the MGT's virtual channel list. The tuner subsystem selects the video and audio elementary streams for the default minor channel at step 104 for processing. Optionally, PSI elementary streams for the minor channel, including EITs and ETTs are read at step 105, shown in phantom, from the transport stream de-multiplexor and stored in memory at step 106, also shown in phantom. The initialization step 100 is completed by placing the EPG system of the present invention in an idle state 107.

Figure 5:
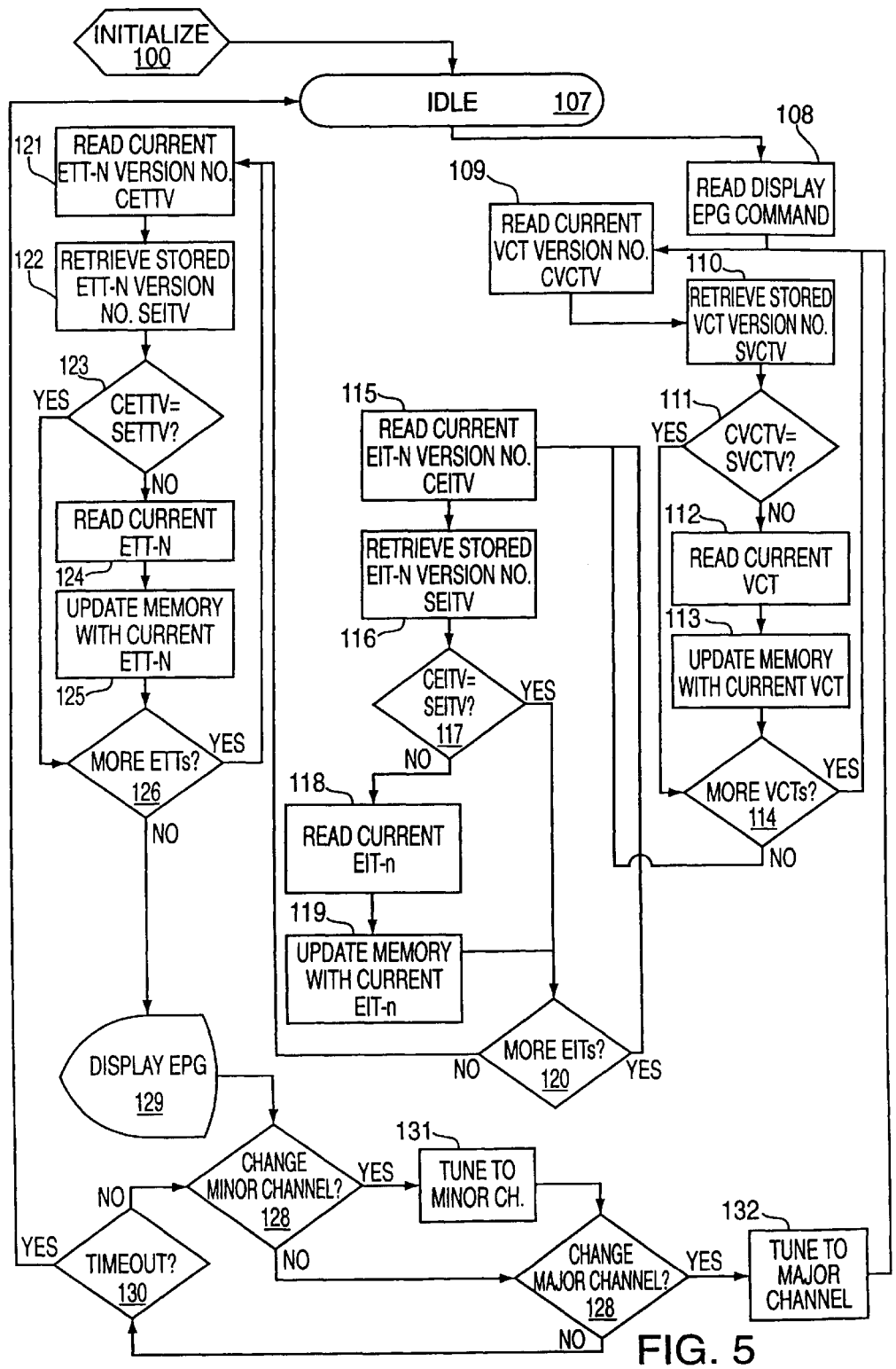
FIG. 5 is a flow diagram of the EPG method of the present invention.

The method of the present invention continues in FIG. 5. After the initialization step 100, and upon detecting a request signal for display of the EPG at step 108, the system moves from the idle state 107 and reads the current version of the VCT (CVCTV) from the currently broadcasting MGT as provided by the transport stream de-multiplexor at step 109. The VCT version number stored in memory (SVCTV) is retrieved 110 and compared at step 111 to the CVCTV. If the two version numbers are different, or no corresponding version of the current VCT exists in memory, the current VCT is read 112 from the digital tuning subsystem at step 112. The stored VCT is then replaced, or updated, at step 113 with the currently broadcasting VCT. The system then checks the MGT to determine if additional VCTs are present in the transport stream. If so, then steps 109 through 114 are repeated for the next VCT.

If at step 112 the system determines that the current version and the stored version of the VCT are identical, then the system jumps to step 114 and checks the MGT to determine if additional VCTs are present. If additional VCTs are present, then steps 109 through 114 are repeated for the next VCT. Additional VCTs are similarly processed until at step 114 it is determined that no more VCTs are present.

When the system determines at step 114 that no additional VCTs are present, the system reads the current version number of the first EIT (CEITV) in the MGT at step 115. The stored version number of the EIT (SEITV) is retrieved from memory at step 116 and compared at step 117 with CEITV. If the current version for the EIT is different, or if no EIT corresponding to the currently broadcasting EIT exists in memory, then the current EIT is gathered from the transport stream at step 118 and stored in memory at step 119. The system then checks the MGT at step 120 to determine whether additional EITs are present. If so, then steps 115 through 120 are repeated for the next EIT.

If the current version and the stored version of the same EIT are identical, the system determines at step 120 if additional EITs are defined in the MGT. If so, then steps 115 through 120 are repeated for the next EIT.

When no additional EITs are defined in the MGT, the system reads the version number for the first current ETT (CETTV) at step 121. The stored version number of the first ETT (SETTV) is retrieved from memory at step 122 and compared at step 123 with CEITV. If the current version for the ETT is different, or if no ETT corresponding to the currently broadcasting ETT exists in memory, then the current ETT is gathered from the transport stream at step 124 and stored in memory at step 125 The system then checks the MGT at step 126 to determine whether additional ETTs are present. If so, then steps 115 through 120 are repeated for the next ETT.

If the current version and the stored version of the same ETT are identical, the system determines at step 126 if additional ETTs are defined in the MGT. If so, then steps 121 through 126 are repeated for the next ETT.

When all VCTs, EITs and ETTs for the default major channel have been updated in memory, the EPG is displayed reflecting the updated program and system information at 129. As the EPG is being displayed the system checks at step 127 to see if the user has selected an alternate minor channel. If a minor channel selection is not detected, the system then checks at step 128 to see if the user has selected an alternate major channel. If a new major channel selection is not detected, the system returns to displaying the EPG. The system continues to poll for new channel selection detection at steps 127, and 128. With each poll, and absent a new channel selection, a timeout check is performed at step 130. The timeout step returns the system to the idle state and discontinues displaying the EPG if there is no activity of the EPG within a predetermined time, for example, 5 seconds.

If at step 127 the system detects a new minor channel selection, the processor instructs the tuner subsystem at step 131 to select the video and audio for the newly selected minor channel. The system of the present invention processes the audio and video of the newly selected minor channel for display at step 129.

If at step 128 the system detects a new major channel select request, the processor retrieves the newly selected major channel's broadcast frequency from memory, and instructs the tuner to tune to that frequency. The system then repeats the process of FIG. 4 beginning with step 109.

In an alternate embodiment, two tuners are provided to permit background validation and updating of both major channel and minor channel information. In that embodiment, a first tuner is used to permit viewing of the presently selected channel, and a second tuner is used concurrently with the first tuner to scan each of the broadcast frequency slots and minor channels for each broadcast frequency.

In view of the foregoing disclosure and detailed description, it is clear that the system of this invention includes a tuner/de-multiplexor subsystem, as well as a processor subsystem and audio/video subsystems. These subsystems, in combination with the machine readable steps stored in a memory in the processor subsystem, permit generating an electronic program guide for display on a video display.

It is evident in view of the foregoing discussion that the system and EPG of the present invention displays only validated, or updated, program and system information. Advantageously, such validated, or updated, program and system information ensures that the viewer is presented with only contemporaneous information for actively broadcasting channels, and that the event information and contextual information associated with the events are accurate and up-to-the-minute.

It is also evident that the system and EPG of the present invention enables the on-screen selection of alternate minor and major channels. Once an alternate channel is selected, the system tunes to the broadcast frequency of the selected channel, and the EPG of the system displays only updated program and system information for that channel.

It is also clear in view of the forgoing disclosure that the process of the present invention permits generating an EPG displaying only updated program and system information.

It is also evident that the process of the present invention permits identifying modifications or changes to the content of the broadcasted elementary streams to thereby enable automatic updating the program and system information stored in memory. Advantageously, such automatic updating of program and system information ensures that the viewer will be presented with accurate, up-to-the-minute events, schedules, and contextual information.

While the invention has been described in conjunction with specific embodiments, it is evident that many alternatives, modifications, permutations and variations will become apparent to those skilled in the art in light of the foregoing description. For example, the process of FIG. 4 may also include a background polling feature that updates stored PSI data even when the EPG is not being displayed. Accordingly, it is intended that the present invention embrace all such alternatives, modifications and variations as fall within the scope of the appended claims.

What is claimed is:

1. A method of generating an electronic program guide comprising the steps of:

receiving digital elementary streams that include program guide information;

processing said digital elementary streams to extract said program guide information included in said digital elementary streams;

displaying broadcaster listings that correspond with different broadcasters; and displaying minor channel listings that correspond with minor channels that are currently available for a selected broadcaster, said minor channels providing minor channel programs that are being simultaneously broadcast by said selected broadcaster.

2. The method of claim 1 further comprising a step of displaying an event information panel that includes listings for future minor channel programs to be broadcast on a selected minor channel of said selected broadcaster, said event information panel being configured such that said listings for said future minor channel programs are situated vertically with respect to time.

3. The method of claim 2 wherein said event information program panel is configured such that a listing for a first minor channel program is disposed below a listing for a second minor channel program, wherein said first minor channel program is to be broadcast later in time with respect to said second minor channel program.

4. The method of claim 1 further comprising a step of displaying a video panel that presents a minor channel program in a video format, said minor channel program being a program that is being broadcast on a selected minor channel that corresponds to a selected minor channel listing.

5. The method of claim 4 wherein said broadcaster listings and said minor channel listings are transparently overlaid on said video panel.

6. The method of claim 4 further comprising a step of displaying an information panel that includes textual description of said minor channel program, said information panel being situated adjacent to said video panel, said information panel being variable in size to increase or decrease the size of said video panel.

7. The method of claim 1 further comprising a step of displaying an information panel in response to a selection of a specific minor channel listing from said minor channel listings, said information panel including a textual description of a minor channel program that is being broadcast on a minor channel associated with said specific minor channel listing, said information panel being displayed concurrently with said minor channel listings.

8. The method of claim 7 further comprising a step of displaying an event information panel that is separate from said information panel, said event information panel including information about a future minor channel program to be broadcast on said minor channel.

9. The method of claim 1 further comprising a step of displaying a system information panel that includes current time information and quality of signal information.

10. The method of claim 9 wherein said system information panel is configured to automatically appear from a hidden status in response to a prescribed condition.

11. A system for displaying an electronic program guide comprising:

a digital tuner configured to selectively receive digital elementary streams that include program guide information;

a processor operatively coupled to said digital tuner to extract said program guide information included in said digital elementary streams; and a video/graphics display driver operatively coupled to said digital tuner and said processor to display an electronic program guide, said electronic program guide including broadcaster listings that correspond to different broadcasters, said electronic program guide further including minor channel listings that correspond to minor channels that are currently available for a selected broadcaster, said minor channels providing minor channel programs that are being simultaneously broadcast by said selected broadcaster.

12. The system of claim 11 wherein said video/graphics display driver is configured to display an event information panel that includes listings for future minor channel programs to be broadcast on a selected minor channel, said event information panel being configured such that said listings for said future minor channel programs are situated vertically with respect to time.

13. The system of claim 12 wherein said event information program panel is configured such that a listing for a first minor channel program is disposed below a listing for a second minor channel program, wherein said first minor channel program is to be broadcast later in time with respect to said second minor channel program.

14. The system of claim 11 wherein said video/graphics display driver is configured to display a video panel that presents a minor channel program in a video format, said minor channel program being a program related to a selected minor channel listing.

15. The system of claim 14 wherein said video/graphics display driver is configured such that said broadcasters listings and said minor channel listings are transparently overlaid on said video panel.

16. The system of claim 14 wherein said video/graphics display driver is configured to display an information panel that includes textual description of said minor channel program, said information panel being situated adjacent to said video panel, said information panel being variable in size to increase or decrease the size of said video panel.

17. The system of claim 11 wherein said video/graphics display driver is configured to display an information panel in response to a selection of a specific minor channel listing from said minor channel listings, said information panel including a textual description of a minor channel program that is being broadcast on a minor channel associated with said specific minor channel program, said information panel being displayed concurrently with said minor channel listings.

18. The system of claim 17 wherein said video/graphics display driver is configured to display an event information panel that is separate from said information panel, said event information panel including information about a future minor channel program to be broadcast on said minor channel associated with said specific minor channel listing.

19. a method of generating an electronic program guide comprising the steps of:

displaying broadcaster listings that correspond with different broadcasters, each of said broadcaster listings being associated with a physical channel;

displaying minor channel listings that correspond with minor channels that are currently available for a selected broadcaster, said minor channel listings being related to programs that are currently being broadcast over said selected physical channel by said selected broadcaster;

displaying an event information panel that includes future program listings for a selected minor channel, a future program panel configured such that a listing for a first minor channel program is disposed below a listing for a second minor channel program, wherein said first minor channel program is to be broadcast later in time than said second minor channel program.

20. The method of claim 19 further comprising a step of displaying a video panel that presents a minor channel program in a video format, said minor channel program being a program that is being broadcast on said selected minor channel.

21. The method of claim 20 wherein said broadcaster listings and said minor channel listings are transparently overlaid on said video panel.

22. The method of claim 20 further comprising a step of displaying an information panel that includes textual description of said minor channel program, said information panel being situated adjacent to said video panel, said information panel being variable in size to increase or decrease the size of said video panel.

23. The method of claim 19 further comprising a step of displaying an information panel in response to a selection of a specific minor channel listing from said minor channel listings, said information panel including a textual description of a minor channel program that is being broadcast on a minor channel associated with said specific minor channel listing, said information panel being displayed concurrently with said minor channel listings.

* * * * *